United States Patent
Erdtmann et al.

(10) Patent No.: US 6,234,624 B1
(45) Date of Patent: *May 22, 2001

(54) INK JET PRINTING METHOD

(75) Inventors: David Erdtmann, Rochester, NY (US); Alan R. Pitt, Sandridge; Trevor Wear, Harrow, both of (GB)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/218,137

(22) Filed: Dec. 21, 1998

(51) Int. Cl.⁷ .................................. G01D 11/00
(52) U.S. Cl. ................ 347/100; 347/105; 347/98; 106/31.6
(58) Field of Search .................. 347/100, 98, 105

(56) References Cited

U.S. PATENT DOCUMENTS 4,395,524 * 7/1983 Emmons et al. ............... 526/307.2
5,651,813    7/1997 Santilli et al. .
6,030,439 *  2/2000 Erdtmann et al. ............... 106/31.6
6,127,453 * 10/2000 Erdtmann et al. ............... 523/160

* cited by examiner

Primary Examiner—John Barlow
Assistant Examiner—Manish Shah
(74) Attorney, Agent, or Firm—Harold E. Cole

(57) ABSTRACT

An ink jet printing method, including the steps of:
  A) providing an ink jet printer that is responsive to digital data signals;
  B) loading the printer with ink-receptive substrates;
  C) loading the printer with an ink jet ink composition comprising from about 0.5% to about 30% by weight of a pigment, a carrier and a hydrophobically capped oligomeric acrylamide dispersant in a ratio of dispersant:pigment from about 0.1:1 to about 5:1; and
  D) printing on an ink-receptive element using the ink jet ink in response to the digital data signals.

11 Claims, No Drawings

INK JET PRINTING METHOD

FIELD OF THE INVENTION

This invention relates to a method of using a dispersant for a pigmented ink jet ink.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor lightfastness. When water is used as the carrier, such inks also generally suffer from poor water fastness.

In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process. Pigmented inks require a water soluble dispersant in the pigment slurry during the milling process. Such a dispersant is necessary to produce a colloidally stable mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time. In general, dispersions suffer from poor colloidal stability due to particle agglomeration and/or sedimentation, thus limiting the usefulness of the dispersions in inks.

Although a wide variety of dispersing agents are known for pigmented ink jet inks, they are not without certain problems. For example, many dispersing agents are very selective as far as being able to disperse pigments to sub-micron size. In many instances, each class of pigments may require a specific dispersing agent. Another problem encountered with some dispersing agents is that the resulting inks suffer from unacceptable image quality properties. This can include unacceptable coalescence, banding, bleeding, densities, or other defects seen on the final printed image. Yet another problem with many commercially available dispersants is that they yield dispersions with very low surface tensions. Thus, there is a continuing need for improved dispersing agents for pigmented inks.

DESCRIPTION OF RELATED ART

U.S. Pat. No. 5,651,813 discloses the use of sodium N-methyl-N-oleoyl taurate dispersants in ink jet pigmented inks. However, there is a problem with these dispersants in that under some circumstances they produce images on glossy receivers which can exhibit unacceptable image quality defects. It would be desirable to produce a pigment dispersion which would produce inks that when printed onto glossy receivers have high D-max's, very good image quality, and do not exhibit any defects which would be noticeable to the customer. Furthermore, it would be desirable to have a dispersant which would be able to disperse a wide variety of pigments.

It would also be desirable to produce pigment dispersions with a low particle size in order to obtain better covering power and which would have less tendency to clog the ink jet nozzles.

It is an object of this invention to provide a method of using a dispersant for a pigmented ink jet ink which will enable the particle size of the dispersed pigment to be lower than that obtained using prior art dispersants. It is another object of this invention to provide a method of using a dispersant for an ink jet ink which will produce images which have a high D-max, and which are free of defects.

SUMMARY OF THE INVENTION

These and other objects are achieved in accordance with this invention which relates to an ink jet printing method, comprising the steps of:

A) providing an ink jet printer that is responsive to digital data signals;

B) loading the printer with ink-receptive substrates;

C) loading the printer with an ink jet ink composition comprising from about 0.5% to about 30% by weight of a pigment, a carrier and a hydrophobically capped oligomeric acrylamide dispersant in a ratio of dispersant:pigment from about 0.1:1 to about 5:1; and D) printing on an ink-receptive element using the ink jet ink in response to the digital data signals.

Use of the dispersants in the invention will produce images which have a high D-max, and which are free of defects. The dispersing agents used in accordance with the invention are highly effective in reducing pigment particles to much less than one Jm in size during the milling process. These dispersions are also characterized by excellent colloidal stability, lack of flocculation and/or sedimentation. Finally, these dispersing agents are useful with a wide variety of pigments.

DETAILED DESCRIPTION OF THE INVENTION

Any hydrophobically capped oligomeric acrylamide dispersant may be used in the invention provided it produces the desired results. In a preferred embodiment of the invention, the hydrophobically capped oligomeric acrylamide dispersant has the formula (I):

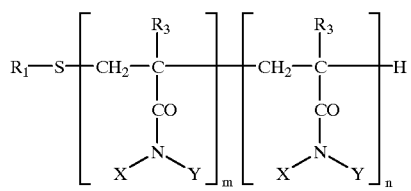

or the formula (II)

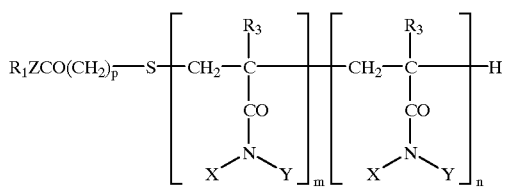

or the formula (III)

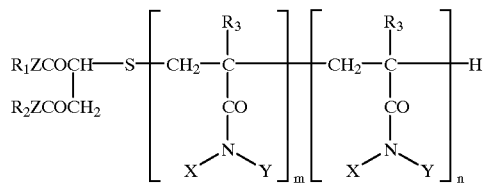

wherein each $R_1$ and $R_2$ independently represents a linear or branched alkyl, alkenyl or arylalkyl group having from 1 to about 30 carbon atoms, such as octyl, 2-ethylhexyl, decyl, dodecyl, octadecyl, octadecenyl, 3-phenylpropyl, 3-phenyl-2,2-dimethylpropyl etc.; with the sum of $R_1$ and $R_2$ comprising from about 8 to about 50 carbon atoms;

each $R_3$ independently represents hydrogen or a methyl group;

each X independently represents hydrogen or an alkyl group containing up to about 4 carbon atoms, such as methyl, ethyl or isopropyl etc.;

each Y independently represents hydrogen or an alkyl group containing up to about 4 carbon atoms, such as methyl, ethyl or isopropyl etc., or a hydroxylated or sulfonated alkyl group containing up to about 4 carbon atoms, such as tris(hydroxymethyl) or 2,2-dimethylethyl sulfonate, wherein the sulfonated alkyl group may contain an associated alkali metal such as sodium, or ammonium or alkylated ammonium counter ion;

each Z independently represents oxygen, NH, $NR_1$ or S;

m is an integer of from about 2 to about 80;

n is an integer of from 0 to about 80; and p is an integer of from about 1 to about 6, preferably from about 1 to 2.

Examples of the hydrophobically capped oligomeric acrylamide dispersants useful in the invention include the following:

TABLE 1

| Acrylamide Dispersant | Chemical Structure |
| --- | --- |
| P-1 | $C_{12}H_{25}S\text{---}[CH\text{---}CH_2]_{10}\text{---}H$, $CONH_2$ |
| P-2 | $C_{10}H_{21}S\text{---}[CH\text{---}CH_2]_{15}\text{---}H$, $CONH_2$ |
| P-3 | $C_{18}H_{37}S\text{---}[CH\text{---}CH_2]_4\text{---}H$, CO, NH, $CH_3\text{---}C\text{---}CH_3$, $SO_3^-Na^+$ |
| P-4 | $C_4H_9CH(C_2H_5)CH_2OCO$, $C_4H_9CH(C_2H_5)CH_2OCO$, $\text{---}S\text{---}[CH\text{---}CH_2]_{10}\text{---}H$, $CONH_2$ |
| P-5 | $C_4H_9CH(C_2H_5)CH_2OCO$, $C_4H_9CH(C_2H_5)CH_2OCO$, $\text{---}S\text{---}[CH\text{---}CH_2]_{15}\text{---}H$, $CON(CH_3)_2$ |

TABLE 1-continued

| Acrylamide Dispersant | Chemical Structure |
|---|---|
| P-6 | $C_{12}H_{25}S-[CH-CH_2]_2-H$, with $-CO-NH-C(CH_3)_2-CH_2-SO_3^-Na^+$ branch |
| P-7 | $C_{16}H_{33}S-[CH-CH_2]_{15}-H$, with $-CO-NH-C(CH_2OH)_3$ branch (HOCH$_2$, CH$_2$OH, CH$_2$OH) |
| P-8 | $C_8H_{17}-CH=CH-(CH_2)_8OCOCH_2S-[CH-CH_2]_4-H$, with $-CO-NH-C(CH_3)_2-CH_2-SO_3^-Na^+$ branch |
| P-9 | $C_{16}H_{33}S-[CH-CH_2]_4-H$, with $-CO-NH-C(CH_3)_2-CH_2-SO_3^-Na^+$ branch |
| P-10 | $C_8H_{17}-CH=CH-(CH_2)_8NHCOCH_2S-[CH-CH_2]_5-H$, with $-CO-NH-C(CH_3)_2-CH_2-SO_3^-Na^+$ branch |
| P-11 | $C_{18}H_{37}S-[CH-CH_2]_4-H$, with $-CO-NH-C(CH_3)_2-CH_2-SO_3^-HN(CH_2CH_2OH)_2^+$ branch |

TABLE 1-continued

| Acrylamide Dispersant | Chemical Structure |
|---|---|
| P-12 | $C_{18}H_{37}S-[CH-CH_2]_4-H$ with side chain $CO-NH-C(CH_3)(CH_3)-SO_3^-H_2N(CH_2CH_2OH)^+$ |

The hydrophobically capped oligomeric acrylamide dispersants useful in the invention may be prepared by methods similar to those in the examples hereafter and in Makromoleculare Chemie, (1992), 193(9), pages 2505–2517.

As noted above, the ink jet ink composition used in the method of the invention contains a hydrophobically capped oligomeric acrylamide dispersant in a ratio of dispersant-:pigment from about 0.1:1 to about 5:1. In a preferred embodiment, the ratio of dispersant:pigment is from about 0.25:1 to about 2.5:1.

In the present invention, any of the known organic pigments can be used. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, a combination of cyan, magenta, yellow, and black (CMYK) pigments should be used. An exemplary four color set is copper phthalocyanine (pigment blue 15), quinacridone magenta (pigment red 122), pigment yellow 74 or pigment yellow 155 and carbon black (pigment black 7). Another exemplary four color set is bis(phthalocyanyl-alumino)tetra-phenyldisiloxane cyan pigment, quinacridone magenta (pigment red 122), pigment yellow 74 or pigment yellow 155 and carbon black (pigment black 7). In a preferred embodiment of the invention, the pigment has a particle size of from about 10 nanometers to about 1000 nanometers.

As noted above, the ink jet ink composition used in the invention comprises from about 0.5% to about 30% by weight of a pigment. In a preferred embodiment of the invention, the ink composition comprises from about 1% to about 5% by weight of the pigment.

The carrier employed in the method of the invention can be water or a mixture of water and at least one water soluble co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen-containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A humectant may also be employed in the ink jet composition used in the method of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition used in the invention is diethylene glycol, glycerol, or diethylene glycol monobutylether. The humectant may be present in any amount effective for the intended purpose. In general, good results have been obtained when the humectant is present in an amount of up to about 70% by weight of the ink jet ink composition, preferably from about 5 to about 50%.

Ink Preparation

A preferred method for making the inks used in the method of the invention is disclosed in U.S. Pat. No. 5,679,138, the disclosure of which is hereby incorporated by reference. In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, preferably approximately 1.0 to 5%, by weight of the total ink composition for most thermal ink jet printing applications. The amount of aqueous carrier medium is in the range of approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a pH in the range of 5 to 9. Anionic and cationic surfactants may be used in the invention as disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont Corp. and the Fluorads® from the 3M Co.

Acceptable viscosity's are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant (0–70 wt. %) is added to help prevent the ink from drying out or crusting in the orifices of the printhead. A preferred humectant for the inks used in the present invention is a mixture of glycerol and diethylene glycol at a final concentration of between 5 and 50 wt. %. A penetrant (0–10 wt. %) may be added to help the ink penetrate the receiving substrate, especially when the substrate is a highly sized paper. A preferred penetrant for the inks used in the present invention is n-propanol at a final concentration of 1–6 wt. %. A biocide (0.01–1.0 wt. %) may be added to prevent unwanted microbial growth which may occur in the ink over time. A preferred biocide for the inks used in the present invention is Proxel® GXL (Zeneca Colours Co.) at a final concentration of 0.05–0.5 wt. %. Additional additives which may optionally be present in ink jet inks include thickeners, conductivity enhancing agents, anti-kogation agents, drying agents, and defoamers.

In the method of this invention, liquid ink drops are applied in a controlled fashion to an ink receptive layer substrate, by ejecting ink droplets from the plurality of nozzles, or orifices, in a print head of ink jet printers Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different methods to control the deposition of the ink droplets. Such methods are generally of two types: continuos stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the utility of the present invention.

EXAMPLES

Example 1

Synthesis of P-1

Acrylamide (35.50 g, 0.50 moles) and 1-dodecanethiol (10.10 g, 0.050 moles) were suspended in ethanol (250 ml) under nitrogen atmosphere in a 1L three necked round bottomed flask equipped with a reflux condenser. The solution was stirred and degassed with nitrogen for 20 minutes. Stirring was continued and the temperature raised to 70° C. over a period of 20 minutes during which time the reagents dissolved. 2,2'-Azo-bis(2-methylpropionitrile)[AIBN] (1.00 g, 6.10 mmoles) was added to the stirred solution at 70° C. and heating continued for 4 hours under the control of an automated reactor system. During this time a white suspension formed. After cooling, the resulting white precipitate was filtered under suction and dried in vacuo to give a white powder (39.6 g, 87%). Analysis of this product was consistent with the desired product P1.

The preparation of other oligomeric species was performed using a similar procedure. Where no precipitate formed the alcoholic solution was washed with heptane to remove excessively hydrophobic by-products as described in the preparation of Polymer P5.

Example 2

Synthesis of Polymer P8

Mercaptoacetic acid (92.10 g, 1.00 moles) and oleyl alcohol (268.5 g, 1.00 moles) were suspended in toluene (1200 ml) in a 2L RB flask. Toluene sulfonic acid hydrate (2.0 g) was added as catalyst and the flask set up for reflux with a Dean & Stark trap. The components went into solution as the mixture was warmed and the whole was refluxed under argon atmosphere for 6 hours during which time approximately 18.5 ml of water collected in the side arm The reaction mixture was concentrated by evaporation under reduced pressure then redissolved in ethyl acetate (1.2L) and washed with saturated aqueous sodium hydrogen carbonate (600 ml). The organic layer was separated, dried over anhydrous magnesium sulfate, filtered and evaporated to give a pale yellow oil (Yield=344.0 g, 100%). Analytical data was consistent with oleyl mercaptoacetate.

Oleyl mercaptoacetate (12.99 g, 0.038 moles), sodium 2-acrylamido-2-methyl-1-propane sulfonate (34.77 g, 0.152 moles) and AIBN (0.13 g) were stirred together in a 3N RB flask. The suspension was degassed by bubbling argon through it for 20 minutes. The mixture was then refluxed for 17 hours. An additional amount of AIBN (0.13 g)was added after 5 hours. The suspension cleared at approximately 50° C. The solution was diluted with methanol (300 ml) and washed with heptane (2×200 ml). The methanol solution was evaporated to give a sticky, off-white solid (45.3 g, 95%). Analysis was consistent with the polymer P8.

Example 3
Synthesis of Polymer P5

Mercaptosuccinic acid (15.10 g, 0.10 moles) and 2-ethyl-1-hexanol (26.30 g, 0.20 moles) were suspended in toluene (200 ml) in a 500 ml round bottomed flask. Toluene sulfonic acid hydrate (0.10 g) was added as catalyst and the flask set up for reflux with a Dean & Stark trap. The components went into solution as the mixture was warmed and the whole was refluxed under argon atmosphere for 18 hours. The reaction mixture was concentrated by evaporation under reduced pressure then redissolved in ethyl acetate (500 ml) and washed sequentially with saturated aqueous sodium hydrogen carbonate (300 ml) and water (300 ml). The organic layer was separated, dried over anhydrous magnesium sulfate, filtered and evaporated to give a pale yellow oil (31.1 g, 83%). Analysis was consistent with di-(2-ethyl-1-hexyl)mercaptosuccinate.

Di-(2-ethyl-1-hexyl)mercaptosuccinate (24.60 g, 0.066 moles) and N,N-dimethylacrylamide (97.65 g, 0.985 moles) were dissolved in methanol (260 ml) in a three necked 500 ml flask. The solution was stirred and degassed by bubbling argon through the solution for 20 minutes. AIBN (0.70 g) was added and the solution heated to reflux for 17 hours under argon atmosphere. A sample was analyzed by MS (walkup) and found to contain product. The methanolic solution was diluted with methanol and then washed with heptane. The methanol layer was re-evaporated to give a deep yellow/brown viscous oil which solidified on cooling (123.0 g, 100%).

Example 4
Control CM-1

A prior art dispersant, sodium N-methyl-N-oleoyl taurate (U.S. Pat. No. 5,651,813) was used to prepare a dispersion of an ink jet ink. The materials are listed in Table 2.

The above components were milled in a 1 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 μm KIMAX® Buchner Funnel obtained from VWR Scientific Products. Particle size distributions were obtained on diluted millgrind samples (about 50:1) using a Leeds & Northrop Ultrafine Particle Analyzer (UPA). The results are listed as a 50% median value An aliquot of the above dispersion to yield 1.00 g pigment was mixed with 8.00 g diethylene glycol, and additional deionized water for a total of 50.0 g. This ink was filtered through a 3-μm filter and introduced into an empty Hewlett-Packard 51626A print cartridge. Images were made with a Hewlett-Packard DeskJet® 540 printer on medium weight resin coated paper containing an imaging layer. The printed image was evaluated by measuring the optical densities in three area patches with maximum ink coverage, and averaging, using an X-Rite® Photographic Densitometer. The D-max readings are shown in Table 2. Image quality defects is defined as the amount of de-glossing in a D-max area, and will be rated as severe, moderate, and none. The de-glossing effect can occur throughout the entire image, or it can appear as a "random spotty appearance". A rating of severe or moderate is given if any part of the image exhibit's the defect.

Milling of comparison dispersants were carried out in the same way as above using the dispersant listed in the following Table 2 and the measurements were made as above. The comparison dispersant is similar in chemical composition to the dispersants used in the invention.

TABLE 2

| Dispersant | Composition | Particle Size (nm) | D-max | Image Quality Defects |
|---|---|---|---|---|
| CM-1 (Control) | Polymeric beads-mean diameter 50 μm (162.5 g) Cyan Pigment - Bis(phthalocyanylalumino)tetra-Phenyl-disiloxane (17.5 g) Oleoyl methyl taurine, sodium salt (10.5 g) De-ionized water (97.0 g) Proxel ® GXL biocide (Zeneca Corp.) (0.1 g) | 76 | 2.3 | Severe |
| I-1 | Polymeric beads Pigment Yellow 74 (10 g) Polymer P1 (10 g) De-ionized water (105 g) Proxel ® GXL (0.1 g) | 13.4 | 2.20 | None |
| I-2 | Polymeric beads Cyan Pigment (10.0 g) Polymer P2 (10 g) De-ionized water (105 g) Proxel ® GXL (0.1 g) | 19.4 | 1.90 | None |
| I-3 | Polymeric beads Cyan pigment (10.0 g) Polymer P3 (10 g) De-ionized water (105 g) Proxel ® GXL (0.1 g) | 17.6 | 1.66 | None |
| I-4 | Polymeric beads Cyan pigment (10.0 g) Polymer P4 (10 g) De-ionized water (105 g) Proxel ® GXL (0.1 g) | 20.7 | 1.87 | None |
| I-5 | Polymeric beads Cyan pigment (10.0 g) Polymer P5 (10 g) De-ionized water (105 g) Proxel ® GXL (0.1 g) | 20.8 | 2.10 | None |
| I-6 | Polymeric beads Cyan pigment (10.0 g) Polymer P6 (10 g) De-ionized water (105 g) Proxel ® GXL (0.1 g) | 148 | 2.30 | None |
| I-7 | Polymeric beads Cyan pigment (10.0 g) Polymer P7 (10 g) De-ionized water (105 g) Proxel ® GXL (0.1 g) | 86 | 2.25 | None |
| I-8 | Polymeric beads Cyan pigment (10.0 g) Polymer P8 (10 g) De-ionized water (105 g) Proxel ® GXL (0.1 g) | 34.0 | 2.10 | None |
| I-9 | Polymeric beads Pigment Red 122 (10.0 g) Polymer P8 (10 g) De-ionized water (105 g) Proxel ® GXL (0.1 g) | 12.1 | 2.50 | None |
| I-10 | Polymeric beads Pigment Red 122 (10.0 g) Polymer P9 (10 g) De-ionized water (105 g) Proxel ® GXL (0.1 g) | 13.1 | 2.35 | None |
| I-11 | Polymeric beads Pigment Red 122 (10.0 g) Polymer P3 (10 g) De-ionized water (105 g) Proxel ® GXL (0.1 g) | 20.3 | 2.50 | None |
| I-12 | Polymeric beads Pigment Yellow 74 (10.0 g) Polymer P5 (10 g) De-ionized water (105 g) Proxel ® GXL (0.1 g) | 1.74 | 1.92 | None |
| I-13 | Polymeric beads Pigment Yellow 74 (10.0 g) Polymer P9 (10 g) De-ionized water (105 g) Proxel ® GXL (0.1 g) | 9.3 | 1.98 | None |

TABLE 2-continued

| Dispersant | Composition | Particle Size (nm) | D-max | Image Quality Defects |
|---|---|---|---|---|
| I-14 | Polymeric beads Pigment Yellow 74 (10.0 g) Polymer P3(10 g) De-ionized water (105 g) Proxel ® GXL (0.1 g) | 13.6 | 1.91 | None |
| I-15 | Polymeric beads Pigment Yellow 74 (10.0 g) Polymer P8(10 g) De-ionized water (105 g) Proxel ® GXL (0.1 g) | 10.9 | 1.95 | None |
| I-16 | Polymeric beads Cyan Pigment (10.0 g) Polymer P8(5 g) Polymer P9(5 g) De-ionized water (105 g) Proxel ® GXL (0.1 g) | 36.1 | 2.62 | None |
| I-17 | Polymeric beads Cyan Pigment (10.0 g) Polymer P8(5 g) De-ionized water (110 g) Proxel ® GXL (0.1 g) | 34.7 | 2.61 | None |
| I-18 | Polymeric beads Cyan Pigment (10.0 g) Polymer P8(15 g) De-ionized water (100 g) Proxel ® GXL (0.1 g) | 24.4 | 2.41 | None |
| I-19 | Polymeric beads Cyan Pigment (10.0 g) Polymer P8(20 g) De-ionized water (95 g) Proxel ® GXL (0.1 g) | 33.6 | 2.47 | None |
| I-20 | Polymeric beads Cyan Pigment (10.0 g) Polymer P10 (10 g) De-ionized water (105 g) Proxel ® GXL (0.1 g) | 43 | 2.35 | None |
| I-21 | Polymeric beads Pigment Yellow 74 (10.0 g) Polymer P10(10 g) De-ionized water (105 g) Proxel ® GXL (0.1 g) | 10.6 | 1.78 | None |
| I-22 | Polymeric beads Pigment Red 122 (10.0 g) Polymer P10(10 g) De-ionized water (105 g) Proxel ® GXL (0.1 g) | 21 | 1.96 | None |
| I-23 | Polymeric beads Pigment Red 122 (10.0 g) Polymer P11 (10 g) De-ionized water (105 g) Proxel ® GXL (0.1 g) | 14.4 | 2.12 | None |
| I-24 | Polymeric beads Pigment Red 122 (10.0 g) Polymer P12 (10 g) De-ionized water (105 g) Proxel ® GXL (0.1 g) | 14.0 | 1.90 | None |
| I-25 | Polymeric beads Pigment Yellow 155 (10.0 g) Polymer P10(10 g) De-ionized water (105 g) Proxel ® GXL (0.1 g) | 11.0 | 1.97 | None |

The above results indicate that image quality defects were eliminated when using the dispersants in accordance with the invention in an ink jet ink and printed onto glossy paper. In addition, the particle sizes of the dispersions produced in accordance with the invention were very low, and the D-max of the images produced using the dispersants in accordance with the invention were acceptable.

The invention has been described in detail with particular reference to certain preferred embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with ink-receptive substrates;
   C) loading said printer with an ink jet ink composition comprising from about 0.5% to about 30% by weight of a pigment, a carrier and a hydrophobically capped oligomeric acrylamide dispersant in a ratio of dispersant:pigment from about 0.1:1 to about 5:1; and
   D) printing on an ink-receptive element using said ink jet ink in response to said digital data signals.

2. The method of claim 1 wherein said hydrophobically capped oligomeric acrylamide dispersant has the formula (I):

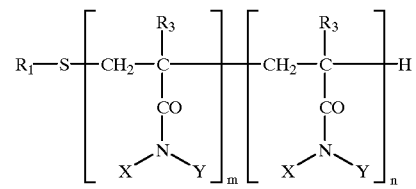

or the formula (II)

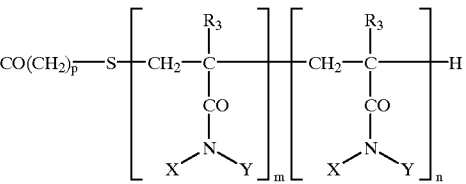

or the formula (III)

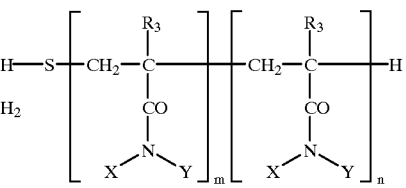

wherein
   each $R_1$ and $R_2$ independently represents a linear or branched alkyl, alkenyl or arylalkyl group having from 1 to about 30 carbon atoms, with the sum of $R_1$ and $R_2$ comprising from about 8 to about 50 carbon atoms;
   each $R_3$ independently represents a hydrogen or methyl group;
   each X independently represents hydrogen or an alkyl group containing up to about 4 carbon atoms;
   each Y independently represents hydrogen or an alkyl group containing up to about 4 carbon atoms or a hydroxylated or sulfonated alkyl group containing up to about 4 carbon atoms;
   each Z independently represents oxygen, NH, $NR_1$ or S;
   m is an integer of from about 2 to about 80;
   n is an integer of from 0 to about 80; and
   p is an integer of from about 1 to about 6.

3. The method of claim 1 wherein a humectant is present in an amount of up to about 70% by weight of said composition.

4. The method of claim 2 wherein $R_1$ is dodecyl, decyl, octadecyl, hexadecyl, octadecenyl and ethylhexyl.

5. The method of claim 2 wherein X and Y are either or both hydrogen or methyl.

6. The method of claim 2 wherein Y is sodium 2,2-dimethyl ethyl sulfonate or tris(hydroxymethyl).

7. The method of claim 2 wherein $R_2$ is 2-ethylhexyl.

8. The method of claim 2 wherein $R_3$ is hydrogen.

9. The method of claim 1 wherein said carrier is water.

10. The method of claim 1 comprising from about 1% to about 5% by weight of said pigment.

11. The method of claim 1 wherein said dispersant is present in a ratio of dispersant:pigment from about 0.25:1 to about 2.5:1.

* * * * *